(12) United States Patent
Bayart et al.

(10) Patent No.: US 7,038,838 B2
(45) Date of Patent: May 2, 2006

(54) OPTICAL AMPLIFIER

(75) Inventors: Dominique Bayart, Clamart (FR); Anne Legrand, Marcoussis (FR)

(73) Assignee: Alcatel, Paris (FR)

( * ) Notice: Subject to any disclaimer, the term of this patent is extended or adjusted under 35 U.S.C. 154(b) by 272 days.

(21) Appl. No.: 10/627,804

(22) Filed: Jul. 28, 2003

(65) Prior Publication Data

US 2004/0196533 A1    Oct. 7, 2004

(30) Foreign Application Priority Data

Aug. 14, 2002 (EP) ................... 02360242

(51) Int. Cl.
*H01S 3/00* (2006.01)
*G02F 1/35* (2006.01)
(52) U.S. Cl. ...................... 359/333; 350/330
(58) Field of Classification Search ............. 359/330, 359/333, 341.1; 372/22
See application file for complete search history.

(56) References Cited

U.S. PATENT DOCUMENTS

| 5,064,265 A | * | 11/1991 | Khanarian et al. .......... 385/130 |
| 5,274,495 A | * | 12/1993 | Shirasaki .................... 359/330 |
| 6,147,793 A |   | 11/2000 | Alford et al. |
| 6,459,525 B1 | * | 10/2002 | Aso et al. ................... 359/332 |

* cited by examiner

*Primary Examiner*—Mark Hellner
(74) *Attorney, Agent, or Firm*—Sughrue Mion, PLLC

(57) ABSTRACT

An optical amplifier is proposed which has an optical waveguide structure) through which signal light and pump light are propagated. The optical waveguide structure has a core with a relatively high refractive index and a clad with a relatively low refractive index, where at least said core exhibits a nonlinear response of second or third order. In a result optical parametric amplification of said signal light is achieved. The amplifier has separate idler light filters for attenuating idler light, which is generated in the process of optical parametric amplification, The position of the idler light filters can be defined placed in said optical waveguide structure at a defined length $L_{max}$.

3 Claims, 3 Drawing Sheets

OPTICAL AMPLIFIER

BACKGROUND OF THE INVENTION

The present invention relates in general to an optical amplifier operating on the principle of optical parametric amplification or four-wave mixing optical amplification, and more particularly to an optical amplifier in which phase matching between signal light and pump light is easily achieved and, hence, effective optical amplification of the signal light can be obtained over a broad frequency band.

Optical amplifiers of the type in which the amplitude of the electric field of light is directly amplified are applicable to the following uses in the optical fiber transmission system:

By increasing the output of a light source of the signal light in an optical transmitter, the transmission distance can be increased. When the optical amplifier is used for the light source of local light in an optical receiver in a coherent optical wave communication system, the reception sensitivity can be improved.

By performing optical amplification in the stage immediately before the photoelectric conversion stage, the reception sensitivity can be improved.

By the direct amplification of light, as compared with the method in a conventional optical repeater in which a light signal is once photo-electrically converted into an electric signal and then the electric signal is amplified, it becomes possible to make the repeater itself smaller in size and also to increase the repeater-to-repeater distance.

There has been known an optical amplifier in which optical parametric amplification of signal light is achieved by nonlinear effect of second order obtained when signal light and pump light are propagated through an optical waveguide structure made of a nonlinear optical material.

There has also been known an optical amplifier in which four-wave mixing optical amplification of signal light is achieved by nonlinear effect of third order obtained when signal light and pump light are propagated through an optical waveguide structure made of a nonlinear optical material.

However, such conventional optical amplifiers have had a disadvantage that phase matching between the signal light and the pump light is not always easily achieved therein and, hence, effective optical amplification of the signal light is obtained only within a narrow frequency band.

From the U.S. Pat. No. 5,274,495 an optical amplifier is disclosed which is adapted such that signal light and pump light are propagated through an optical waveguide structure therein made of an optically nonlinear material to thereby achieve optical parametric amplification or four-wave mixing optical amplification of the signal light, and which is provided with means for attenuating idler light to be generated within the optical waveguide structure by adding special dopants to the fiber.

This allows an attenuation of the idler wave but cannot avoid a repowering of the idler wave during the pump process.

Optical parametric amplification is carried out by a power transfer from a pump wavelength towards a signal wavelength. This energy exchange depends on phase matching between the waves of the two wavelengths, on their power and on fiber nonlinear coefficient. For 'small-signal' e.g. signal with a small power, signal power increases linearly with fiber length. To be efficient the signal power must increase up to the level of the pump power, and than the energy exchange between the wave is reversed. In result the signal wave recharges power back to the pump wave. Then the signal power decreases with length, which makes amplification inefficient. In order to avoid signal power traveling back to the pump, fibers length in known optical parametric amplifiers is shorter than the length from which signal power decreases. Pump power remains non-depleted during amplification. The efficiency of parametric amplification strongly depends on the frequency shift between signal and pump (through phase matching) wave. Consequently signals with different wavelengths do not experience the same gain and for a given fiber length, some wavelengths are more amplified than the others. Finally the gain spectrum is not flat.

Accordingly, an object of the present invention is to provide an optical amplifier in which phase matching between the signal light and the pump light is easily achieved and, hence, effective optical amplification of the signal light can be obtained over a broad frequency band by an effective suppression of the idler wave.

SUMMARY OF THE INVENTION

Viewed from an aspect, the present invention provides an optical amplifier adapted such that signal light and pump light are propagated through an optical waveguide structure therein having a core with a relatively high refractive index and a clad with a relatively low refractive index, at least the core exhibiting a nonlinear response of second order, to thereby achieve optical parametric amplification of the signal light comprising seperate idler light filter means for attenuating idler light, which is generated in the process of optical parametric amplification, within the optical waveguide structure.

Viewed from another aspect, the present invention provides an optical amplifier adapted such that signal light and pump light are propagated through an optical waveguide structure therein having a core with a relatively high refractive index and a clad with a relatively low refractive index, at least the core exhibiting a nonlinear response of third order, to thereby achieve four-wave mixing optical amplification of the signal light, comprising separate idler light filter means for attenuating idler light, which is generated in the process of four-wave mixing optical amplification, within the optical waveguide structure.

According to a preferred embodiment of the present invention, the optical waveguide structure is cut off by a separate idler wave filter means absorbing the idler light.

DETAILED DESCRIPTION OF THE INVENTION

Figure 1:
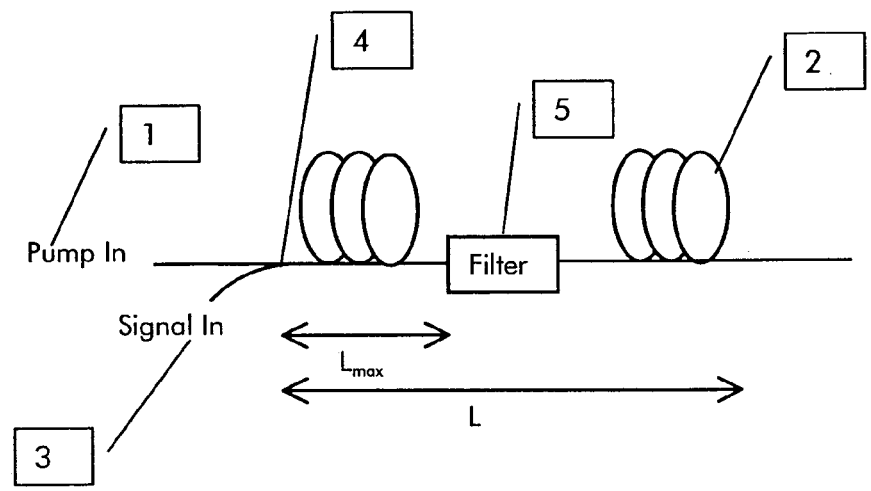
FIG. 1 is a block diagram of an optical amplifier showing a preferred embodiment of the present invention.

FIG. 1 shows an example of a realization of an optical amplifier using the invention. It is mainly composed of a pump device 1 and a piece of amplifying fiber 2 whose length is L. A signal 3 is tapped via a coupler 4 to the amplifying fiber to be amplified. A filter 5 cuts off the piece of amplifying fiber. The optical filter 5 is placed at the distance $L_{max}$ in the piece of amplifying fiber.

Figure 2:
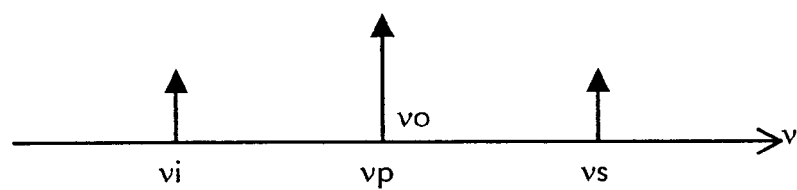
FIG. 2 is a conceptual diagram of optical parametric amplification.

FIG. 2 represents the wavelength of the waves in the amplifying fiber 2. Pump's frequency is $v_p$, signal frequency $v_s$ and an idler is created with the frequency $v_i = 2. v_p - v_s$. If an optical filter centered on $v_i$ is placed at the distance $L_{max}$, the signal will keep its power after $L_{max}$.

Parametric amplification is based on Four-Wave Mixing: two pump photons create one signal photon and one idler photon. So parametric process amplifies the signal and creates a new wave the idler. The propagation of the signal and the idler are linked. Their power increases in the same way and when they are comparable to the pump's one, the signal and the idler give back their power to the pump. These power exchanges result from phase matching. Consequently if phase matching is broken, the power exchanges stop. Suppressing one of the three interacting waves can break phase matching. If the idler wave is filtered at the length where amplification is maximum, then signal will keep its power and the power transfer towards the pump will be avoided. When the pump is non-depleted, i.e. for small-signal, signal gain is again proportional to fiber length.

$$G(dB) = \frac{10}{\ln(10)} 2g P_{po}(W) L_{eff} - 6$$

where.

G is the gain of the signal $P_{po}$ is pump power, (W) in energy units $g^2 = (\gamma P_{po}(W))^2 - (\kappa/2)^2$ is the gain coefficient γ is fiber's nonlinear coefficient κ is the phase matching term The relation reaches maximum gain for the length Lmax defined:

$$L_{max} = \frac{1 - e^{(-\alpha(km^{-1})L_{eff\ max})}}{\alpha(km^{-1})}$$

where.

α is fiber's attenuation $$L_{eff\ max} = \frac{P_{po}(dB) - P_{so}(dB) + 3}{\frac{10}{\ln(10)} 2g - \alpha(dB/km)}$$

where $P_{so}$ is signal power.

In a preferred embodiment a standard DSF (Dispersion Shifted Fiber) represents the amplifying fiber length. The nonlinear coefficient of this DSF is 2 $W^{-1}.km^{-1}$, its zero-dispersion wavelength 1529.2 nm, its dispersion slope 0.07 $ps.nm^{-2}.km^{-1}$ and its attenuation is 0.25 dB/km. Pump wavelength is 1530 nm with a pump power of 30 dBm. The signal wavelength is 1541 nm. $L_{max}$ is calculated with the previous relations to a value of $L_{max}$=2.025 km. Therefore the filter is placed at the distance around 2.1 km.

Since the efficiency of parametric process is maximum for wavelength of total phase matching, this wavelength reaches maximum gain for a shorter length $L_{max}$ than the other wavelengths. Thanks to a filter centered on the idlers of wavelengths of high parametric efficiency, the fiber length of the amplifier could be longer so that wavelengths of low parametric efficiency could achieve maximum gain as well and wavelengths of high parametric efficiency could keep their power.

Figure 3:
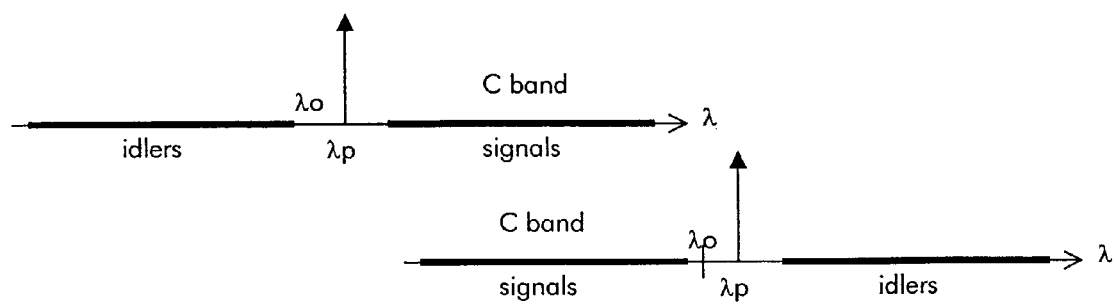
FIG. 3 is another conceptual diagram of parametric amplification
Figure 4:
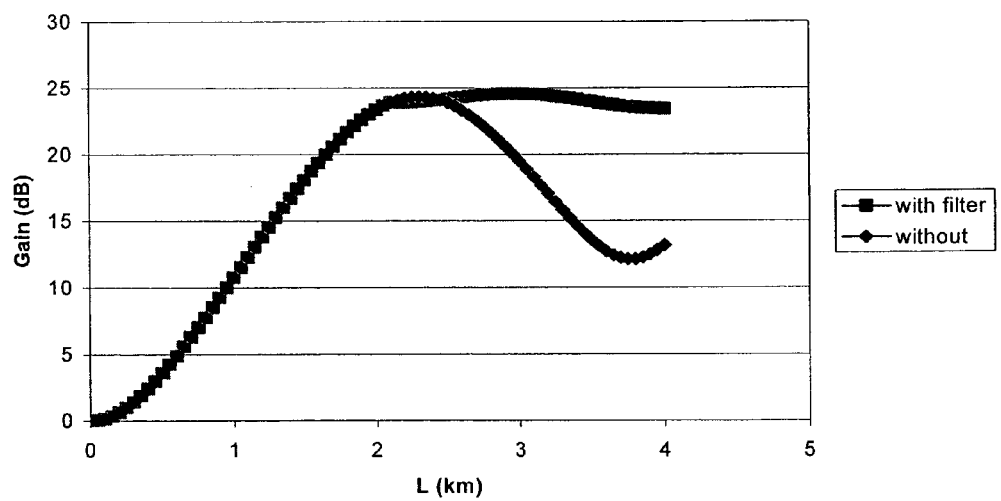
FIG. 4: diagram of signal gain versus length with and without filter

FIG. 3 shows two possibilities to amplify a signal in the C-Band region. Amplification is possible whether vs<vp or vs>vp, in the first case, vi>vp and in the second, vi<vp. For example, if the C band ( wavelength region between is to be amplified, 2 fibers are chosen: a fiber with its zero dispersion around 1530 nm or a fiber with a zero dispersion around 1570 nm. The filter used to suppress the idler is a rejecting filter centered on the idler frequency vi=2 vp-vs.

Figure 5:
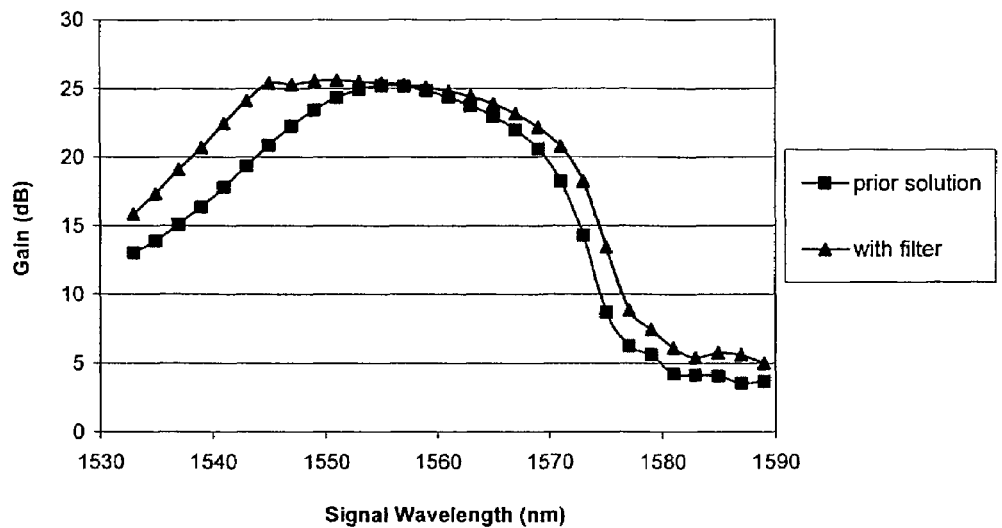
FIG. 5 diagram of the signal gain versus the wavelength with and without filter

FIG. 5 show the calculation of an example, with a highly nonlinear fiber (zero-dispersion wavelength 1529.2 nm, dispersion slope 0.03 $ps/nm^2/km$ and nonlinear coefficient 10 $W^{-1}.km^{-1}$) and a pump ($\lambda_p$=1530 nm, $P_p$=1W), parametric gain has been calculated for several single signals ($P_s$=0 dBm) with and without a filter. The filter suppresses the idler waves of signal wavelengths superior to 1546 nm, when it is placed at 450 m from the input. The total length is 700 m. In the case of the prior art solution, the total length is 500 m.

With the filter, a single-channel signal with wavelength inferior to 1546 nm could be more amplified: at 1543 nm, an improvement of 4.8 dB has been calculated. And for wavelengths of idler waves that are filtered, no drawbacks have been noticed.

Also in the use of WDM transmission this amplifier has been simulated (8 signals with $P_{tot}$=0 dBm) with good results.

Figure 6:
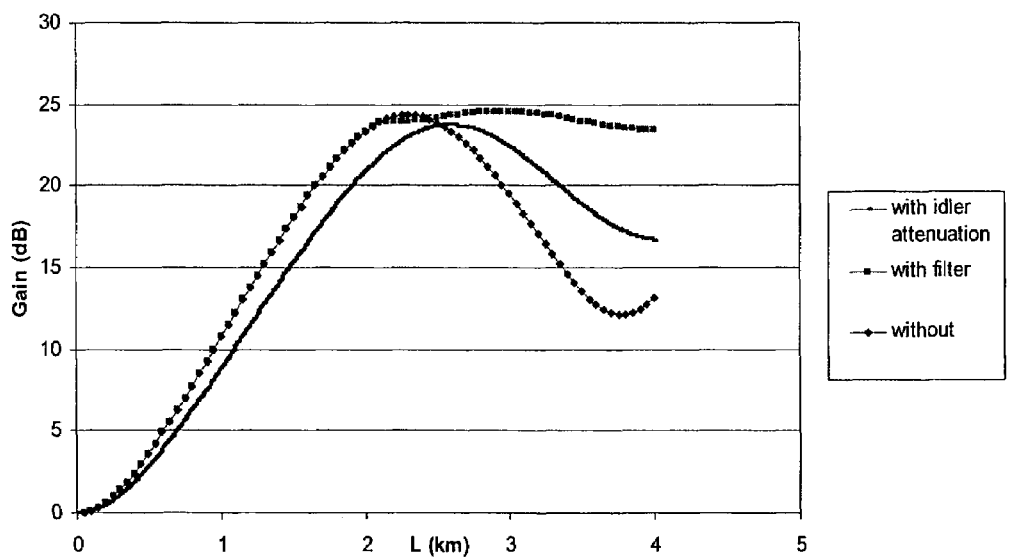
FIG. 6: Comparison of solution with continuous absorption and filter absorption of idler wave.

FIG. 6 presents a simulation with the same parameters as described above but the attenuation of the idler wave was twice the attenuation of the pump or the signal. α(idler)=0.5 dB/km, α(pump)=α(signal)=0.25 dB/km.

Attenuating the idler wave all along the fiber as in prior art does not enable to avoid the power going back to the pump when the signal power is high. The attenuation of the idler reduces the loss of gain but not sufficiently. With a filter, we can see that gain decreases of only 1.2 dB.

The filter 5 for suppressing or attenuating the idler wave can be any filter that is suitable and known by persons skilled in the art.

As an example a Mach-Zehnder structured filter is one possible solution, also a doped glass filter, a Fabry-Perot filter.

The filter should at least reduce the local power of idler wave in the range of 50%.

The invention claimed is:

1. An optical amplifier comprising:
   an optical waveguide structure through which a signal light wave and pump light wave are propagated, said optical waveguide structure having a core with a relatively high refractive index and a clad with a relatively low refractive index, at least said core exhibiting a nonlinear response of second or third order, to thereby achieve optical parametric amplification of said signal light wave; and
   separate idler light filter means (5) for attenuating an idler light wave which is generated in the process of optical parametric amplification, said idler light filter means being placed in said optical waveguide structure at a length $L_{max}$ defined by the difference between power of the pump wave and power of the signal wave, the gain factor of the waveguide, and the absorption of the waveguide.

2. An optical amplifier comprising:
   an optical waveguide structure through which a signal light wave and pump light wave are propagated, said optical waveguide structure having a core with a relatively high refractive index and a clad with a relatively low refractive index, at least said core exhibiting a nonlinear response of second or third order, to thereby achieve optical parametric amplification of said signal light wave; and
   separate idler light filter means (5) for attenuating an idler light wave which is generated in the process of optical parametric amplification, said idler light filter means being placed in said optical waveguide structure at a defined length $L_{max}$,
   where the length $L_{max}$ is $$L_{\text{eff max}} = \frac{P_{po}(\text{dB}) - P_{so}(\text{dB}) + 3}{\frac{10}{\ln(10)} 2g - \alpha(\text{dB/km})},$$

and where
$P_{po}$ is pump power, (dB) in logarithmic units,
$P_{so}$ is signal power,
$g^2 = (\gamma\, P_{po}(W))^2 - (\kappa/2)^2$ is the gain coefficient, $\gamma$ is the waveguide nonlinear coefficient, $\kappa$ is the phase matching term, and $\alpha$ is waveguide attenuation.

3. The optical amplifier according to claim 1, wherein the filter reduces at least 50% of the power of the idler wave.

* * * * *